United States Patent
Das et al.

(10) Patent No.: US 6,560,870 B2
(45) Date of Patent: May 13, 2003

(54) METHOD FOR APPLYING DIFFUSION ALUMINIDE COATING ON A SELECTIVE AREA OF A TURBINE ENGINE COMPONENT

(75) Inventors: Nripendra Nath Das, West Chester, OH (US); Raymond William Heidorn, Fairfield, OH (US); Walter Michael Gmerek, Jr., West Chester, OH (US); David Andrew Jablonka, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/850,896

(22) Filed: May 8, 2001

(65) Prior Publication Data

US 2002/0166231 A1 Nov. 14, 2002

(51) Int. Cl.$^7$ ................................. B23P 15/00
(52) U.S. Cl. ................ 29/889.1; 29/889.7; 29/889.72; 29/402.09; 29/402.16; 427/353
(58) Field of Search ............................. 29/889.1, 889.7, 29/889.72, 402.09, 402.16; 427/253, 252, 250, 142, 287; 428/551

(56) References Cited

U.S. PATENT DOCUMENTS

| | | | | |
|---|---|---|---|---|
| 3,819,338 A | * | 6/1974 | Bungardt et al. ............ 428/652 |
| 3,914,507 A | * | 10/1975 | Fustukian ................... 106/1.05 |
| 4,152,223 A | * | 5/1979 | Wallace et al. ............. 148/518 |
| 4,246,323 A | * | 1/1981 | Bornstein et al. ........... 148/518 |
| RE31,339 E | * | 8/1983 | Dardi et al. ................. 148/527 |
| 4,728,488 A | * | 3/1988 | Gillett et al. ............. 219/76.13 |
| 4,933,239 A | * | 6/1990 | Olson et al. ................... 419/30 |
| 4,944,858 A | * | 7/1990 | Murphy et al. ........ 204/192.15 |
| 4,962,005 A | * | 10/1990 | Alperine et al. ............ 148/518 |
| 5,217,757 A | * | 6/1993 | Olson et al. ................. 427/253 |
| 5,292,594 A | * | 3/1994 | Liburdi et al. .............. 428/610 |
| 5,334,417 A | * | 8/1994 | Rafferty et al. ............. 148/281 |
| 5,366,765 A | * | 11/1994 | Milaniak et al. ............ 427/229 |
| 5,523,169 A | * | 6/1996 | Rafferty et al. .......... 29/402.09 |
| 5,658,614 A | * | 8/1997 | Basta et al. ................. 427/142 |
| 5,788,823 A | * | 8/1998 | Warnes et al. .............. 148/518 |
| 5,837,385 A | * | 11/1998 | Schaeffer et al. ........... 148/277 |
| 6,042,880 A | * | 3/2000 | Rigney et al. ............. 29/889.1 |
| 6,045,863 A | * | 4/2000 | Olson et al. ................. 427/142 |
| 6,168,874 B1 | * | 1/2001 | Gupta et al. ................ 428/623 |
| 6,332,926 B1 | * | 12/2001 | Pfaendtner et al. ......... 118/721 |
| 6,332,931 B1 | * | 12/2001 | Das et al. ................... 148/240 |
| 6,334,907 B1 | * | 1/2002 | Das et al. ................... 148/280 |
| 6,440,496 B1 | * | 8/2002 | Gupta et al. ................ 427/252 |
| 6,458,473 B1 | * | 10/2002 | Conner et al. .............. 428/623 |
| 6,482,470 B1 | * | 11/2002 | Reeves et al. .............. 427/253 |

* cited by examiner

*Primary Examiner*—I Cuda Rosenbaum
(74) *Attorney, Agent, or Firm*—VG Ramaswamy; McNees, Wallace & Nurick

(57) ABSTRACT

A method for applying diffusion aluminide coating on a selective area of a turbine engine component and the coating produced by that method is disclosed. A quartz infrared lamp heats only substantially the localized area of the component to be coated, rather than the complete part. Either halide activated or non-activated tape is applied on the area to be coated and is held in place during coating using a high temperature dimensionally stable tape holder manufactured from graphite or ceramic. The quartz infrared lamp is used to heat only the desired area to a coating temperature of about 1800° F. to about 2000° F. under an inert atmosphere for about 3 to about 8 hours to achieve the desired aluminide coating thickness. No powder masking of the machined surface area is required. Due to the localized heating, aluminum vapor generated from the tape will only deposit aluminide coating on the taped area.

21 Claims, 5 Drawing Sheets

METHOD FOR APPLYING DIFFUSION ALUMINIDE COATING ON A SELECTIVE AREA OF A TURBINE ENGINE COMPONENT

FIELD OF THE INVENTION

The invention relates generally to components of the hot section of gas turbine engines, and in particular, to a diffusion aluminiding process for depositing an aluminide coating onto a selective area of a turbine component.

BACKGROUND OF THE INVENTION

In gas turbine engines, for example, aircraft engines, air is drawn into the front of the engine, compressed by a shaft-mounted rotary compressor, and mixed with fuel. The mixture is burned, and the hot exhaust gases are passed through a turbine mounted on a shaft. The flow of gas turns the turbine, which turns the shaft and drives the compressor. The hot exhaust gases flow from the back of the engine, providing thrust that propels the aircraft forward.

During operation of gas turbine engines, the metal parts of the engine, are in contact with hot, corrosive gases. The metal parts require particular attention to protect them from these combustion gases. These metallic parts include blades and vanes used to direct the flow of the hot gases, as well as other components such as shrouds and combustors.

In order to protect the metallic parts from the hot, oxidative and corrosive effects of the combustion gases, environmental coatings typically are applied to the metallic parts. These environmental coats may be produced by holding the part to be coated at temperature in an atmosphere rich in a certain element or elements, often aluminum. These elements diffuse into the surface of the part to form a diffusion coating, a process called chemical vapor deposition (CVD). In one form, the environmental coat is made of a diffusion nickel aluminide or platinum aluminide. Diffusing Al into the substrate has also proven effective against high temperature oxidation in addition to improving adherence of the ceramic TBC. The CVD bond coat surface forms an aluminum oxide scale during exposure to oxygen containing atmospheres at elevated temperatures, providing increased resistance to further high temperature oxidation. Other well-known methods are utilized to form diffusion aluminide coatings. While not meant to be inclusive, some other of these methods include "over the pack" aluminizing, pack aluminizing, flash electroplating of nickel and platinum onto a substrate followed by application of aluminum by one of these well-known methods. Frequently, these environmental layers also serve as a bond coat in a thermal barrier system that utilizes a thermal barrier coating over the diffusion aluminide layer, thereby impeding the transfer of heat from the hot exhaust gases to the parts by providing an insulating layer and allowing the exhaust gases to be hotter than would otherwise be possible.

Chipping of the protective coating sometimes occurs during the life of the part. This chipping damage may be caused during machining of the aluminide coated component, by poor handling of the component during subsequent manufacturing processes, during routine maintenance or through the normal operational environment of the turbine component. When repairing chipping damage, it is not cost effective to remove the remaining undamaged coating and re-coat the entire turbine component. Instead, localized repair of only the damaged surface is attempted. Current practice for localized repair of aluminide coating on damaged or selective areas of the turbine component is exemplified by, for example, U.S. Pat. Nos. 5,334,417 and 6,045,863, involving slurry or tape processes.

For example, in a proprietary commercial form presently used by the Assignee of the present invention, a self-adhesive halide activated or non-activated iron aluminum alloy containing about 55–57 wt. % aluminum tape or, alternatively, a cobalt aluminum alloy containing about 50–60 wt. % aluminum tape is placed on the selective area to be coated. The taped component is placed inside a metal coating box or can and packed in an inert aluminide oxide powder to hold the tape in place and mask the machined area during the coating operation. The coating box or can is heated to between about 1800° F. and about 2000° F. under an inert (reducing) atmosphere for a time sufficient to permit diffusion of aluminum to achieve the desired aluminide coating thickness, typically about three to eight hours just to accomplish the soak at the temperature to achieve a coating thickness of about 1 to about 3 mils. One cycle can take from 14–32 hours.

However, built up stress from the thermal expansion mismatch between the engine component and the inert aluminum oxide powder creates warpage or distortion of the selectively coated engine component, making the component unusable in the engine. The unusable component must be discarded at great cost.

What is needed are improved methods to apply diffusion aluminide coating to a selective area of an engine component, which results in little or no warpage or distortion of the component, hence, less waste. The present invention fulfills this need, and further provides related advantages.

SUMMARY OF THE INVENTION

In one form, the present invention provides both an improved method for applying diffusion aluminide coating on a selective area of a turbine engine component and the coatings produced by that method, utilizing a quartz infrared lamp to heat only the localized area of the component to be coated, rather than the complete part.

Either halide activated or non-activated aluminum source tape is applied on the area to be coated and is held in place during coating using a high temperature dimensionally stable tape holder. The quartz infrared lamp is used to heat only the selective area to a coating temperature of about 1800° F. to about 2000° F. under an inert atmosphere for about 3 to about 8 hours to achieve the desired aluminide coating thickness. While the soak time remains the same to achieve a desired coating thickness, the overall cycle time is reduced to 6 to 12 hours. The desired thickness of the coating will vary with time, with longer times providing thicker coatings.

Due to the localized heating and application, aluminum vapor generated from the tape will only deposit aluminide coating on the taped area. As a result, no masking of the component machined surface area adjacent to the regions undergoing coating is required.

Optionally, a thermal barrier coating (TBC) such as yttrium-stabilized zirconia (YSZ) may be deposited over the repaired aluminide coating of the present invention when the diffusion aluminide is part of a thermal barrier coating system.

One advantage of the present invention is that the coating produced by this invention demonstrates a distortion-free, aluminided engine component. By avoiding the significant warpage caused by current practice of heating the entire component in a packed coating box, there is little to no resultant waste from scrapped parts, with significant cost savings.

Another advantage of the present invention is that there is a 65% reduction in heat up cycle time and a 75% reduction in cool down cycle time, with resultant cost savings. Current practice requires long heat up and cool down cycles of generally 5–12 hours per each cycle, due to the heating up and cooling down of a large mass comprised of aluminum oxide powder plus the entire component.

Still another advantage of the present invention is a significant labor cost reduction. Masking of machined surfaces with aluminum oxide powder is no longer required due to the localized heating and application of coating material utilized by the present invention.

Because masking of the component is not necessary, yet another advantage of the present invention is that the process is more environmentally friendly than current practice since aluminum oxide powder waste is reduced.

Continuing and often interrelated improvements in processes and materials, such as the improvements of the present invention, can provide cost reductions and major increases in the performance of devices such as aircraft gas turbine engines.

Other features and advantages of the present invention will be apparent from the following more detailed description of the preferred embodiment taken in conjunction with the accompanying drawings which illustrate, by way of example, the principles of the invention.

DETAILED DESCRIPTION OF THE PREFERRED EMBODIMENTS

Although the method of repair and the coating produced by the method of the present invention are generally applicable to components that operate within environments characterized by relatively high temperatures, and are therefore subject to severe thermal stresses and thermal cycling, the present invention is not limited to these "hot section" components of a jet turbine engine.

Examples of such hot section components include the high and low-pressure turbine nozzles and blades, shrouds, vanes, combustor liners and augmentor hardware of gas turbine engines. Substrate materials often used in these turbine parts or airfoils for aircraft engines and power generation equipment may include nickel, cobalt, or iron based superalloys. The alloys may be cast or wrought superalloys. Examples of such substrates are GTD-111, GTD-222, René 80, René 41, René 125, René 77, René N4, René N5, René N6, 4th generation single crystal superalloy-Mx-4, Hastalloy X, and cobalt-based HS-188. These superalloys, although developed for high temperature applications, still require protection resulting from environmental and/or thermal deterioration.

Figure 1:
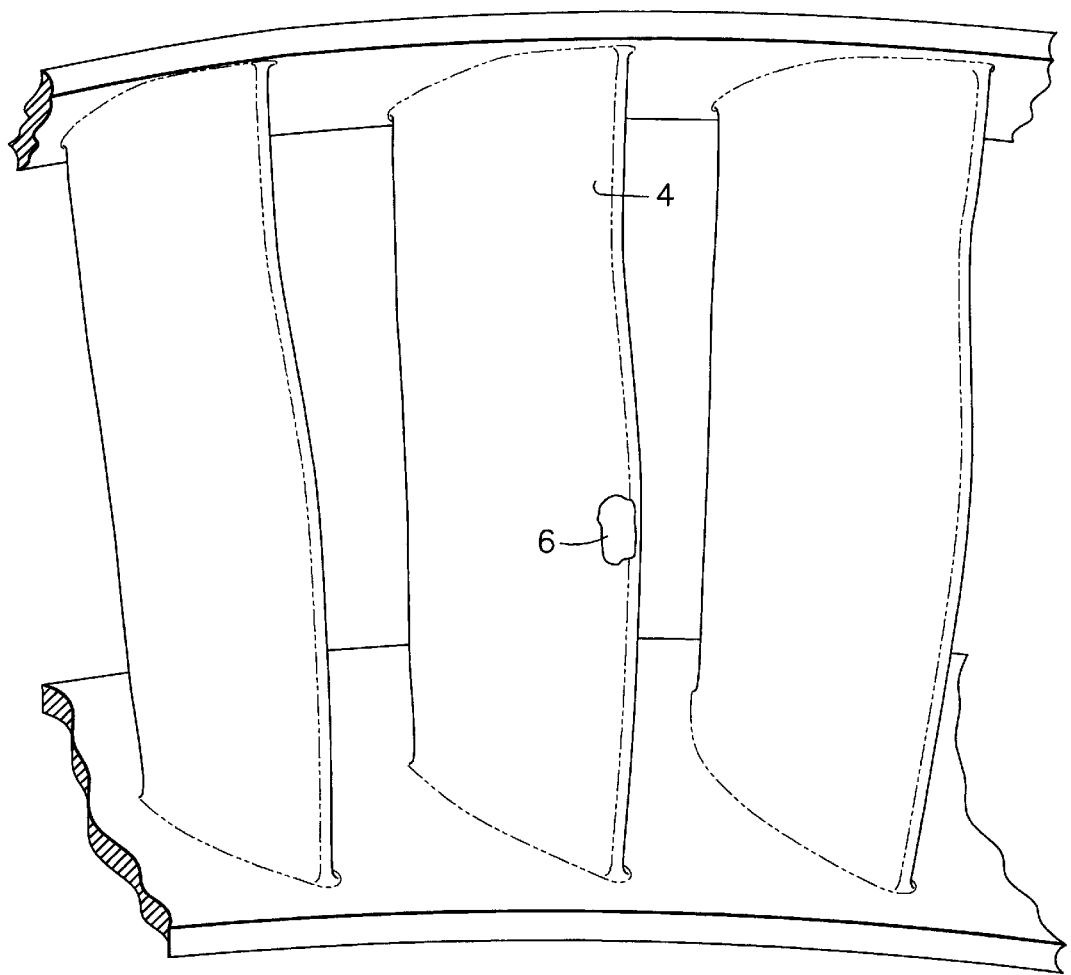
FIG. 1 is a representative view of a turbine vane with chipping damage.

Referring now to the figures, where like parts have the same numbers, in accordance with a preferred embodiment of the invention, there is shown in FIG. 1 a jet turbine engine component, for example, a jet turbine vane 4, having a selective area of imperfection in the environmental coating, for example, a chipped region 6 in which substrate metal is exposed. The environmental coating may be, for example, a diffusion aluminide applied for environmental coating, for example, a chemical vapor deposition aluminide coating, well known in the art.

The present invention allows for the "spot" repair of the selective area of imperfection in the environmental coating without the significant warpage and distortion problems associated with current practice. Pre-treatment of the selective area is to the extent that it is free of dirt, grease, and other like contaminants must be removed.

Figure 2:
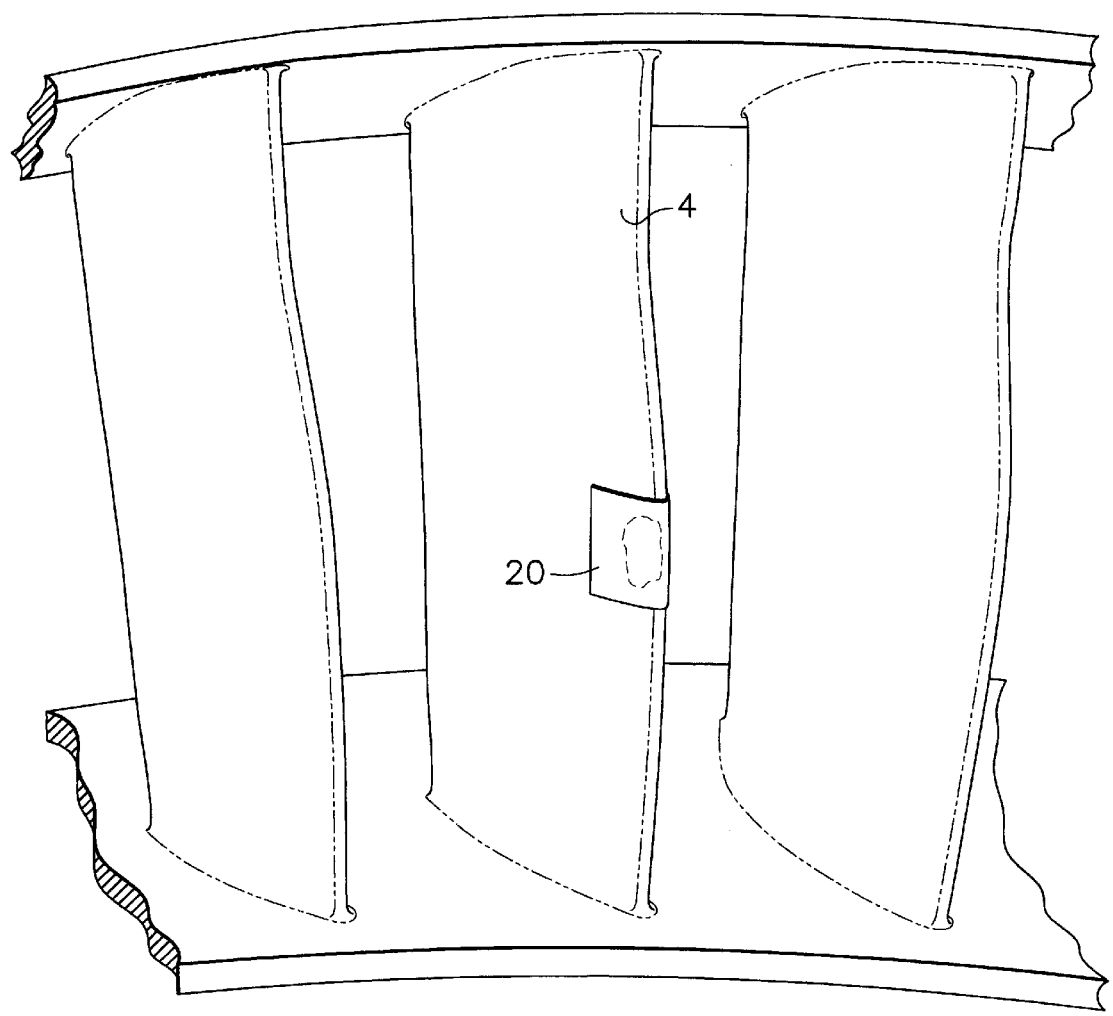
FIG. 2 is a representative view of the tape applied to the vane.

As shown in FIG. 2, a metal source coating tape 20 is positioned using known methods on the vane 4 to cover the chipped region 6. The metal source coating tape 20 may be, for example, any of the current practice metal source coating tapes, such as CODAL tape, manufactured by the Assignee of the present invention. The tape 20 may contain, for example, halide activated or non-activated iron aluminum alloy containing about 55–57 wt. % aluminum or, alternatively, a cobalt aluminum alloy containing about 50–60 wt. % aluminum. All that is required, however, is that the tape 20 contain a metallic source that can serve as a reservoir of replacement material. The metal source may be, for example, aluminum, chromium, aluminum chromium alloy, silicon aluminum alloy, titanium aluminum alloy, vanadium, vanadium aluminum alloy, cobalt aluminum and combinations thereof. The metal source coating tape 20 may optionally contain a halide carrier compound, such as, for example, aluminum fluoride, aluminum chloride, ammonium fluoride, ammonium chloride, potassium fluoride, potassium bromide and mixtures thereof. Addition of a halide carrier compound permits a halogen to react with the metal source at elevated temperatures to carry the metal ions to the surface of the component where they react with the substrate, the process of which is well known.

Figure 3:
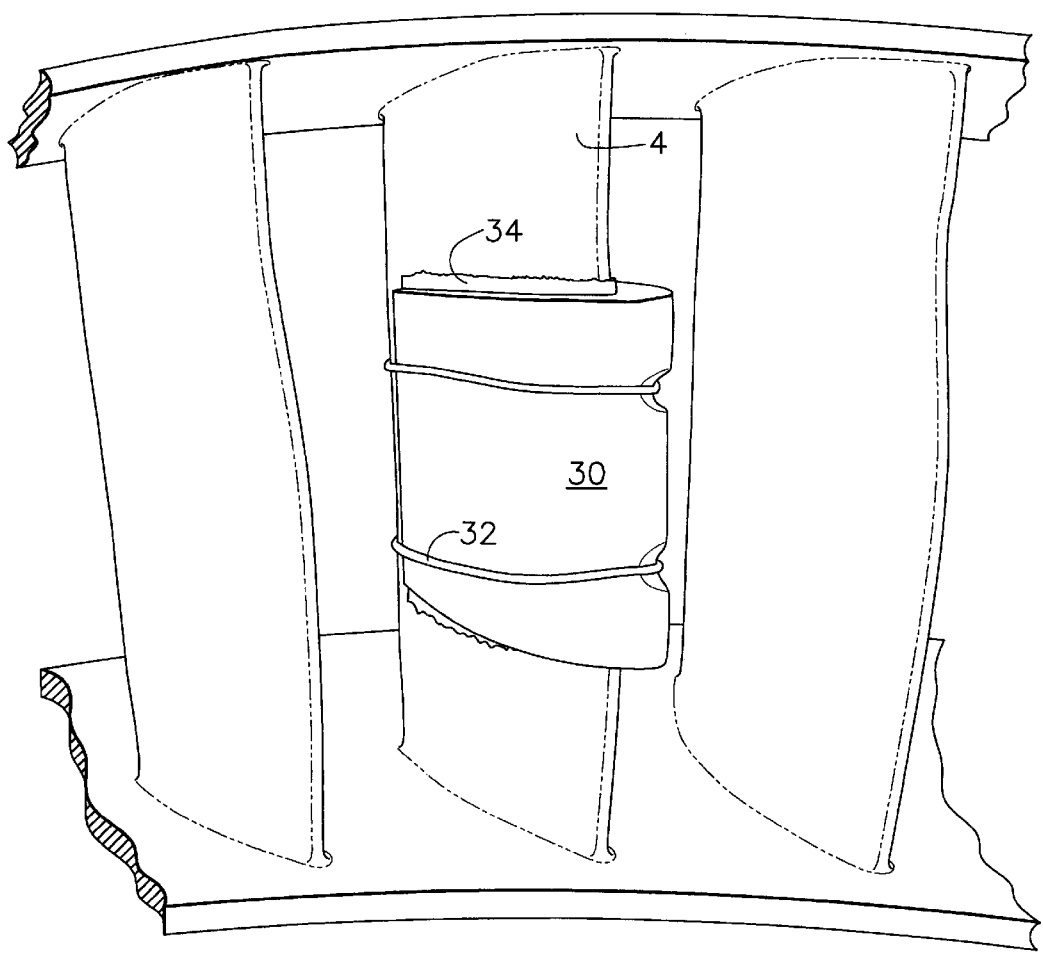
FIG. 3 is a representative view of the tape holder positioned on the vane.

Optionally, to permit ease in placement and initial retention of the metal source coating tape 20 over the imperfection, the metal source coating tape 20 is self-adhering. As shown in FIG. 3, a high temperature dimensionally stable tape holder 30 is placed against the metal source coating tape 20 to maintain the metal source coating tape 20 in contact with the vane 4. The tape holder 30 is mechanically attached to the vane 4, for example, by non-reactive wires 32 which circumscribe both the vane 4 and the tape holder 30, or the tape holder may be attached with high temperature dimensionally stable clips to maintain the tape holder 30 in position on the vane 4. The tape holder 30 is required even though a self-adhesive metal source coating tape 20 is used, because as the component and tape 20 are brought to temperature, as described below, the adhesive binder which typically is an organic material, is burned off, requiring mechanical attachment to maintain the metal source contained within the tape 20 in contact with the component.

The high temperature dimensionally stable wire 32, clips and tape holder 30 are fabricated from a material that will withstand temperatures above about 2000° F. without deforming, for example, graphite, ceramic, carbon—carbon-composites, ceramic-matrix composites and combinations thereof. Optionally, the high temperature dimensionally stable tape holder 30 further includes a high temperature dimensionally stable cushioning material 34 intermediate the tape holder 30 and the metal source coating tape 20, for example, a felt material of, for example, graphite, ceramic, carbon—carbon composite, ceramic matrix composite and combinations thereof. The cushioning material 34 compresses upon initial placement in contact with the metal source coating tape 20, subsequently expanding to fill the void created as the adhesive binder material is burned off.

The high temperature dimensionally stable tape holder 30 may be any shape that will maintain the metal source tape 20 in contact with the chipped region 6, as it is brought to and maintained at temperature. In a preferred embodiment, the shape of the inner surface (not shown) of the tape holder 30 substantially mirrors the selective area of the region undergoing repair.

Figure 4:
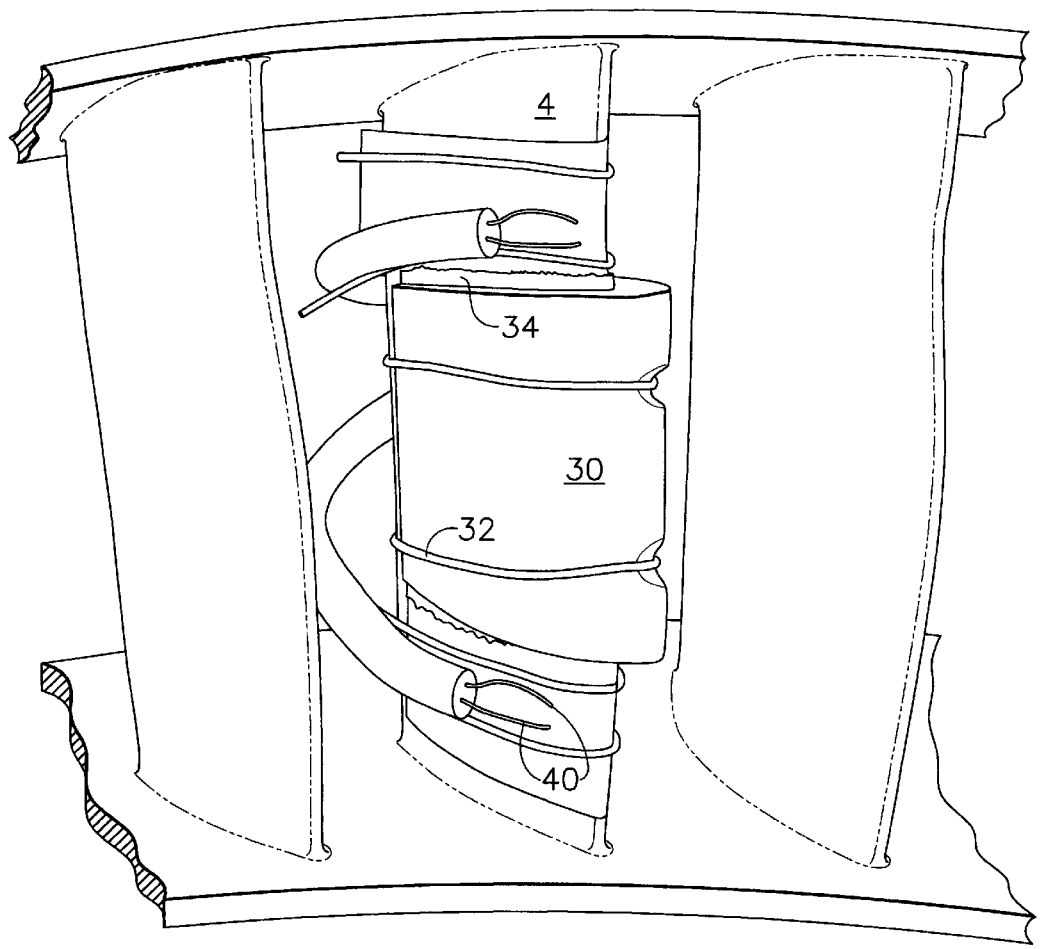
FIG. 4 is a representative view of an alternate embodiment depicting thermocouples attached to the vane.

A heat source (not shown), for example, a quartz infrared lamp, is positioned to heat substantially only the selective area of the component to an effective temperature for an effective amount of time under an inert atmosphere to achieve the desired metal coating thickness. Optionally, as shown in FIG. 4, one or more thermocouples 40 may be placed adjacent to the chipping damage 6 to monitor the coating temperature. The thermocouples 40, when used in conjunction with a controller, can precisely control the coating temperature.

In the preferred embodiment, the selective area is heated in an inert atmosphere to a temperature of about 1800° F. to about 2000° F. for about 3 to about 8 hours to achieve a coating thickness of about 1 mil to about 3 mil: The inert atmosphere is, for example, argon or hydrogen but can be a non-oxidizing atmosphere such as nitrogen. Because only the substantially selective and localized area of the component is in contact with a metallic source and is heated to a sufficiently elevated temperature, metal vapor, for example, aluminum vapor, generated from the tape will only deposit metal, for example, aluminide coating, on the taped area. Powder masking of the machined surface of the component, as required in current practice, is therefore not necessary, as no material capable of forming a coating is present in any adjacent areas.

The present method of applying a diffusion coating on a selective area of a turbine engine component is also part of a novel jet turbine engine component repair system whereby a thermal barrier coating (TBC) (not shown) is applied to the selective area following the application of the diffusion coating of the present invention. The TBC such as, for example, yttrium-stabilized zirconia (YSZ) may be deposited over the repaired bond coat of the present invention using techniques well known in the art.

The following example demonstrates the present method of applying a diffusion coating on a selective area of a turbine engine component:

EXAMPLE 1

A coated scrap aircraft engine vane segment manufactured from René 77 nickel-based superalloy was coated and the coating was intentionally damaged. Aluminide coating was removed from a small area of the convex side trailing edge of the airfoil exposing substrate metal to simulate chipping. Halide activated self-adhesive CODAL tape was applied to the small area of exposed substrate and held in place using a graphite tape holder and graphite felt. Two thermocouples were placed adjacent to the exposed area of substrate to be repaired for monitoring and to precisely control the coating temperature in combination with a controller.

The taped component was placed inside an argon atmosphere chamber and the small area having the exposed substrate was heated to 1925° F.+/−25° F. temperature using a 12,000 watt quartz lamp for four hours. The lamp was cycled by the controller to maintain temperature within the temperature range.

Figure 5:
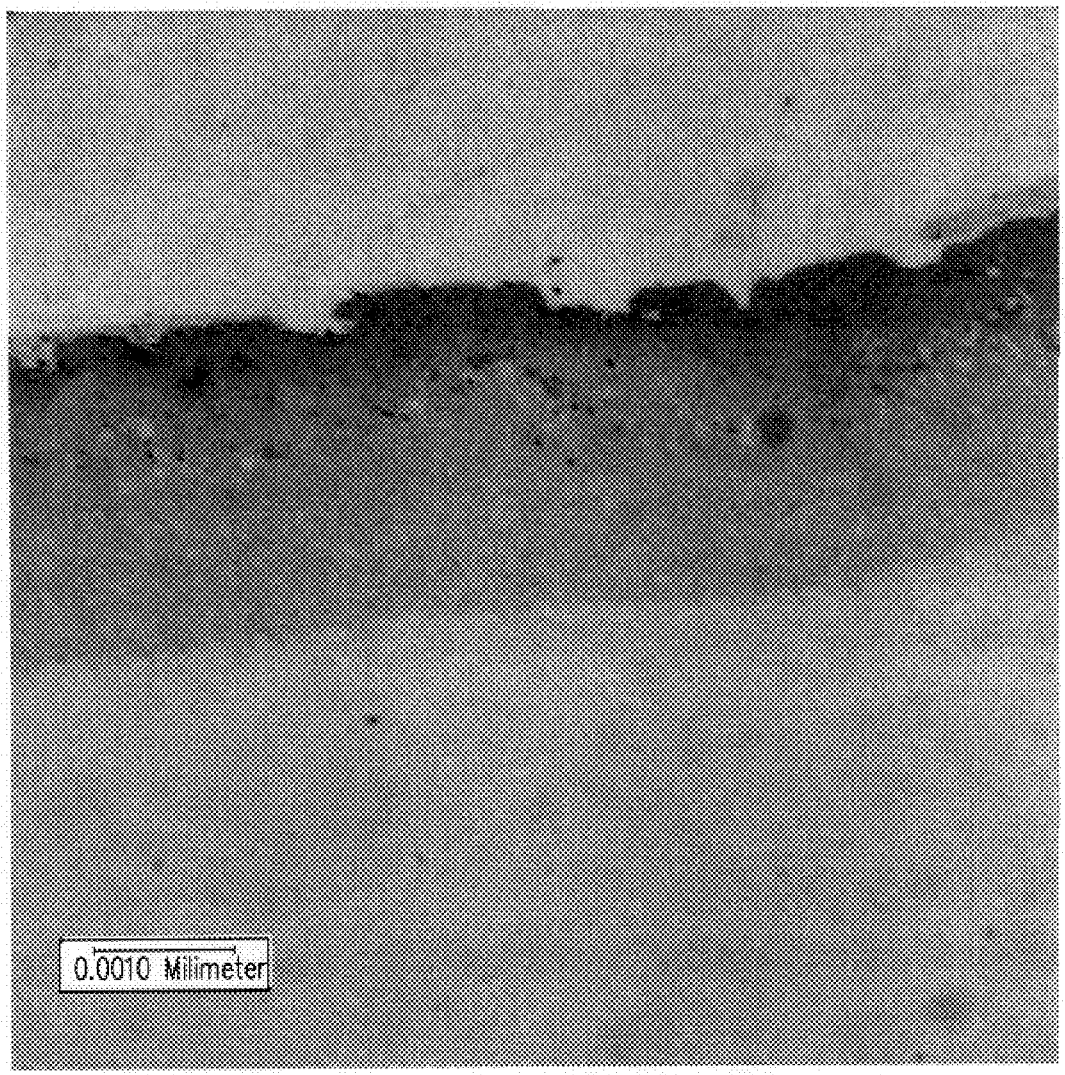
FIG. 5 is a photomicrograph of the repaired selective area of Example 1.

Inspection of the repaired vane segment showed no sign of distortion or warpage of the component. Metallographic evaluation of the area showed evidence of achieving the desired aluminide thickness of about 2 mil, see FIG. 5. The regions adjacent the small area were substantially unaffected.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method of applying a diffusion metal coating to a selective area of a turbine engine component having a deficiency of metal coating comprising the steps of:
   positioning a metal source coating tape in contact with the selective area;
   holding the coating tape in contact with the selective area using a tape holder that is stable at high temperatures; and
   heating the selective area to an effective temperature for an effective amount of time under an inert atmosphere to form a metal coating of predetermined thickness on the selective area.

2. The method of claim 1 wherein step of positioning the metal source coating tape comprises positioning a metal source selected from the group consisting of aluminum, chromium, aluminum chromium alloy, silicon aluminum alloy, titanium aluminum alloy, vanadium, vanadium aluminum alloy, cobalt aluminum and combinations thereof.

3. The method of claim 2 wherein the step of positioning the metal source coating tape further includes positioning a metal source coating tape that includes an activator compound.

4. The method of claim 3 wherein the activator compound includes a halide.

5. The method of claim 4 wherein the activator compound that includes halide is selected from the group consisting of aluminum fluoride, aluminum chloride, ammonium chloride, ammonium fluoride, potassium fluoride, potassium bromide, and mixtures thereof.

6. The method of claim 1 wherein the step of holding metal source coating tape in contact is accomplished with a self-adhering tape.

7. The method of claim 1 wherein the step of holding the coating tape high temperature dimensionally stable tape holder is fabricated from a material selected from the group consisting of graphite, ceramic, carbon—carbon composite, ceramic matrix composite and combinations thereof.

8. The method of claim 1 wherein an inner surface of the high temperature dimensionally stable tape holder substantially mirrors the selective area.

9. The method of claim 1 wherein the high temperature dimensionally stable tape holder includes a cushioning material intermediate the tape holder and the metal source coating tape.

10. The method of claim 8 wherein the cushioning material is a felt material selected from the group consisting of graphite, ceramic and combinations thereof.

11. The method of claim 1 further including the step of fixing the high temperature dimensionally stable tape holder to the component.

12. The method of claim 10 wherein the method of fixing the high temperature dimensionally stable tape holder is mechanical.

13. The method of claim 11 wherein the mechanical method of fixing the high temperature dimensionally stable tape holder is selected from the group consisting of wiring and clipping.

14. The method of claim 1 wherein the substantially selective area is heated by a quartz infrared lamp.

15. The method of claim 1 further including the step of placing one or more thermocouples adjacent to the selective area to monitor and precisely control the effective temperature.

16. The method of claim 1 wherein the effective temperature is about 1800° F. to about 2000° F.

17. The method of claim 1 wherein the effective amount of time is about 3 hours to about 8 hours.

18. The method of claim 1 wherein the inert atmosphere is selected from the group consisting of argon and hydrogen.

19. The method of claim 1 wherein the predetermined metal coating thickness is about 1 mil to about 3 mil.

20. The method of claim 2 wherein the diffusion metal coating is an aluminide coating about 1 mil to about 3 mil in thickness.

21. A turbine engine component repair system comprising the steps of:

selecting a turbine engine component, the component having a selective area to be repaired;

positioning a metal source coating tape on the selective area;

holding the coating tape in place with a high temperature dimensionally stable tape holder;

heating substantially only the selective area to an effective temperature for an effective amount of time under an inert atmosphere to achieve a metal coating of a predetermined thickness; and applying a thermal barrier coating of predetermined thickness to the metal coating.

* * * * *